US011959610B2

(12) United States Patent
Gromfeld

(10) Patent No.: US 11,959,610 B2
(45) Date of Patent: Apr. 16, 2024

(54) COMBINED LUMINOUS MODULE THAT IMAGES THE ILLUMINATED SURFACE OF A COLLECTOR

(71) Applicant: VALEO VISION, Bobigny (FR)

(72) Inventor: Yves Gromfeld, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 17/777,799

(22) PCT Filed: Nov. 18, 2020

(86) PCT No.: PCT/EP2020/082607

§ 371 (c)(1),
(2) Date: May 18, 2022

(87) PCT Pub. No.: WO2021/099430

PCT Pub. Date: May 27, 2021

(65) Prior Publication Data

US 2022/0412529 A1 Dec. 29, 2022

(30) Foreign Application Priority Data

Nov. 19, 2019 (FR) ...................................... 1912908

(51) Int. Cl.
*F21S 41/33* (2018.01)
*F21S 41/148* (2018.01)
(Continued)

(52) U.S. Cl.
CPC ........... *F21S 41/333* (2018.01); *F21S 41/148* (2018.01); *F21S 41/151* (2018.01); *F21V 7/06* (2013.01); *F21V 7/08* (2013.01)

(58) Field of Classification Search
CPC ...... F21S 41/148; F21S 41/151; F21S 41/333; F21S 41/338
See application file for complete search history.

(56) References Cited

U.S. PATENT DOCUMENTS 9,671,079 B2 6/2017 Honda
10,655,809 B1 * 5/2020 Juneau .................. F21S 41/365
(Continued)

FOREIGN PATENT DOCUMENTS

CN 105090855 A1 11/2015
DE 102010013821 * 10/2011 .............. F21S 43/40
(Continued)

OTHER PUBLICATIONS

European Patent Office, International Search Report (with English translation) and Written Opinion of corresponding International Application No. PCT/EP2020/082607, dated Jan. 27, 2021.
(Continued)

*Primary Examiner* — Zheng Song
(74) *Attorney, Agent, or Firm* — Valeo Vision

(57) ABSTRACT

A luminous motor-vehicle module including in a first light source, and a first reflective surface that is configured to collect and reflect the light rays emitted by the first light source into a first light beam, a second light source and a second reflective surface that is configured to collect and reflect the light rays emitted by said second light source into a second light beam, and an optical system configured to project the first and second light beams; the first and second light sources emitting the light rays in the same direction, the first and second reflective surfaces are offset along the optical axis and the optical system is configured to form an image of the second reflective surface.

17 Claims, 3 Drawing Sheets

(51) Int. Cl.
*F21S 41/151* (2018.01)
*F21V 7/06* (2006.01)
*F21V 7/08* (2006.01)

(56) References Cited

U.S. PATENT DOCUMENTS

| | | | | |
|---|---|---|---|---|
| 11,519,579 | B2 * | 12/2022 | Kang | F21S 41/265 |
| 2007/0247865 | A1 * | 10/2007 | Kinoshita | F21S 41/255<br>362/538 |
| 2009/0310353 | A1 * | 12/2009 | Inaba | F21S 41/148<br>362/235 |
| 2013/0272009 | A1 * | 10/2013 | Fujiu | F21S 41/24<br>362/516 |
| 2014/0362572 | A1 * | 12/2014 | Sun | F21S 41/148<br>362/245 |
| 2015/0043236 | A1 * | 2/2015 | Yamamoto | F21S 43/19<br>362/516 |
| 2015/0116980 | A1 | 4/2015 | Li et al. | |
| 2015/0241012 | A1 * | 8/2015 | Wang | F21S 41/663<br>362/516 |
| 2016/0097505 | A1 * | 4/2016 | Kinouchi | F21S 41/151<br>362/509 |
| 2018/0142859 | A1 * | 5/2018 | Watanabe | B60Q 1/0058 |
| 2018/0186279 | A1 | 7/2018 | Chen et al. | |
| 2018/0356064 | A1 * | 12/2018 | Yamamoto | F21S 41/43 |
| 2021/0231279 | A1 * | 7/2021 | Ohashi | F21S 41/663 |

FOREIGN PATENT DOCUMENTS

| | | | |
|---|---|---|---|
| DE | 102014107130 | A1 | 4/2015 |
| EP | 3179158 | A1 | 6/2017 |
| EP | 3369987 | A1 | 10/2018 |
| EP | 3396237 | A1 | 10/2018 |

OTHER PUBLICATIONS

China Patent Office, Office Action of corresponding Chinese Patent Application No. 202080093904.7, dated Jan. 30, 2024.

* cited by examiner

COMBINED LUMINOUS MODULE THAT IMAGES THE ILLUMINATED SURFACE OF A COLLECTOR

CROSS-REFERENCE TO RELATED APPLICATIONS

This application is filed under 35 U.S.C. § 371 U.S. National Phase of International Application No. PCT/EP2020/082607 filed Nov. 18, 2020 (published as WO2021099430), which claims priority benefit to French application No. 1912908 filed on Nov. 19, 2019, the disclosures of which are herein incorporated by reference in their entirety.

TECHNICAL FIELD

The invention relates to the field of luminous lighting and signaling, and more particularly to the field of motor vehicles.

BACKGROUND OF THE INVENTION

It is generally known how to produce a cutoff-containing lighting beam using one or more deflector-comprising luminous modules. Such a luminous module conventionally comprises a first collector with a first reflective surface of revolution with an elliptical profile, of skullcap shape in a half-space bounded by a horizontal plane. An essentially point-like light source, such as a light-emitting diode, is located at a first focal point of the reflective surface and shines light into the half-space in the direction of said surface. The rays are thus reflected in a convergent manner toward a second focal point of the first reflective surface. A generally planar, auxiliary reflective surface with a cutoff-forming edge level with the second focal point ensures an upward reflection of any rays that do not pass precisely through the second focal point, these rays then being refracted by a thick lens toward the bottom of the lighting beam. This auxiliary reflective surface is commonly referred to as a "deflector" as it "deflects" toward the top of the projecting lens any rays that would otherwise form an upper portion of the lighting beam. This first light beam contains a horizontal cutoff that may be kinked, and corresponds to the type of lighting beam referred to as a low beam. It is also known to provide a second light source and a second collector that forms a second reflective surface, these elements being opposite the first light source, the first collector and the first reflective surface and configured to form a second light beam of the type referred to as a high beam. The second light source may comprise a plurality of separately activatable illuminating regions, and the second reflective surface may be segmented into a plurality of sectors, so as to form a segmented light beam.

Such a luminous module has the drawback of requiring the deflector and the cutoff-forming edge to be positioned with a high degree of precision. Thus, the projecting lens must be a thick lens because of its small focal length, this increasing its weight and complicating the production thereof, in particular as regards sink marks. In addition, the collector has a certain height and, thus, a certain heightwise bulk.

BRIEF SUMMARY OF THE INVENTION

The objective of the invention is to mitigate at least one of the drawbacks of the aforementioned prior art. More particularly, the objective of the invention is to provide a luminous module able to form a light beam, potentially a cutoff-containing light beam, that is compact and more economical to produce.

The subject of the invention is a luminous module, in particular for a motor vehicle, said module comprising a first light source able to emit light rays, and a first reflective surface configured to collect and reflect the light rays emitted by said first light source into a first light beam along an optical axis of the module; a second light source and a second reflective surface configured to collect and reflect the light rays emitted by said second light source into a second light beam along the optical axis; an optical system configured to project the first and second light beams; noteworthy in that the first and second light sources emit the light rays in the same direction, the first and second reflective surfaces are offset along the optical axis, and the optical system is configured to form an image of the second reflective surface.

By forming an image of the second reflective surface, what is meant is that the optical system has a focal point located on or in proximity to the second reflective surface and has a sufficient depth of field. The latter is advantageously at least 30% and more advantageously the entirety of the length, along the optical axis, of the second reflective surface. A projecting lens of large focal length and of small height allows a large depth of field to be obtained. Advantageously, the rays incident on the optical system are parallel to the optical axis or are inclined by less than 25°, and preferably by less than 15°, with respect to said optical axis, so that the paraxial approximation applies.

The first light beam advantageously forms a low automotive lighting beam or one portion of such a beam. It may for example be a beam containing a horizontal flat cutoff or a kinked cutoff. Alternatively, the first light beam allows The second light beam advantageously forms, in combination with the first light beam, a high automotive lighting beam, and for example a segmented high automotive lighting beam. The second light beam may also be a complementary beam participating in the formation of a low beam or even of an advantageously segmented high beam.

The optical system may comprise a projecting lens or one or more mirrors.

According to one advantageous embodiment of the invention, the first and second reflective surfaces are formed on the same collector.

According to one advantageous embodiment of the invention, the second reflective surface is segmented transversely to the optical axis so as to form adjacent strips of reflective surface, the second light source comprising a plurality of individually activatable light-emitting regions that extend transversely and that are associated with said adjacent strips of reflective surface.

According to one advantageous embodiment of the invention, the second reflective surface comprises a rear edge forming a horizontal cutoff in the second beam.

According to one advantageous embodiment of the invention, the optical system has a focal point located on the second reflective surface or at a distance from said second reflective surface smaller than 10 mm.

According to one advantageous embodiment of the invention, the focal point of the optical system is located on the rear edge of the second reflective surface or at a distance from said rear edge smaller than 10 mm.

According to one advantageous embodiment of the invention, each of the first and second reflective surfaces has an elliptical or parabolic profile.

According to one advantageous embodiment of the invention, the luminous module further comprises an optical concentrating device placed optically between the second light source and the second reflective surface, and configured to concentrate the light rays emitted by said second light source toward a rear edge of the second reflective surface. The optical concentrating device is advantageously a lens or a series of lenses when the second light source comprises a series of individually activatable light-emitting regions.

According to one advantageous embodiment of the invention, the first reflective surface has an elliptical profile with a first focal point corresponding to the first light source and a second focal point, said luminous module further comprising an auxiliary reflective surface with a front edge located at said second focal point, said front edge forming an edge forming a horizontal cutoff, with or without a kink, in the first beam. The auxiliary reflective surface is advantageously planar. It is a question of a deflector. It is advantageously parallel to, or aligned with, the optical axis.

According to one advantageous embodiment of the invention, the rear edge of the second reflective surface is adjacent to, or coincides with, the front edge of the auxiliary reflective surface, which forms a horizontal cutoff, with or without a kink, in the first beam.

According to one advantageous embodiment of the invention, said luminous module further comprises a third light source able to emit light rays, and a third reflective surface adjacent to, and in front of, the second reflective surface, said third surface being configured to collect and reflect the light rays emitted by said third light source into a third light beam along the optical axis.

The third light beam advantageously complements the second light beam so as to form, in combination with the first light beam, a high automotive lighting beam, and for example a segmented high automotive lighting beam.

According to one advantageous embodiment of the invention, the third reflective surface comprises a rear edge forming a horizontal cutoff in the third beam.

According to one advantageous embodiment of the invention, the third reflective surface is segmented transversely to the optical axis so as to form adjacent strips of reflective surface, the third light source comprising a plurality of individually activatable light-emitting regions that extend transversely and that are associated with said adjacent strips of reflective surface.

According to one advantageous embodiment of the invention, the first reflective surface is adjacent to, and behind, the second reflective surface, and the optical system is configured to also form an image of the first reflective surface.

Advantageously, the first and second light beams complement each other to form, in combination with a cutoff-containing light beam formed by another module, a high automotive lighting beam, and for example a segmented high automotive lighting beam.

According to one advantageous embodiment of the invention, the first reflective surface is segmented transversely to the optical axis so as to form adjacent strips of reflective surface, the first light source comprising a plurality of individually activatable light-emitting regions that extend transversely and that are associated with said adjacent strips of reflective surface.

The measures of the invention are advantageous in that they allow a plurality of horizontal-cutoff-containing beams to be produced with a single module, the module remaining compact, in particular heightwise, and simple to produce. Imaging an illuminated reflective surface, with sufficient depth of field, allows a sharp projected luminous image to be obtained and, thus, cutoffs that are also sharp to be produced by means of the edges of the surface in question. In addition, as the paraxial approximation applies, i.e. as the rays that are inclined little with respect to the optical axis and are not very far from said axis, the lens forming the projecting system may be a thin lens, for example of a thickness smaller than 6 mm, this allowing it to be produced in a single plastic injection-molding operation.

DETAILED DESCRIPTION OF THE INVENTION

In the following description, the notions "front", "in front of", "rear" and "behind" are to be understood with respect to a main direction of propagation of the light, namely along the optical axis, from the one or more light sources to an optical projecting system.

Figure 1:
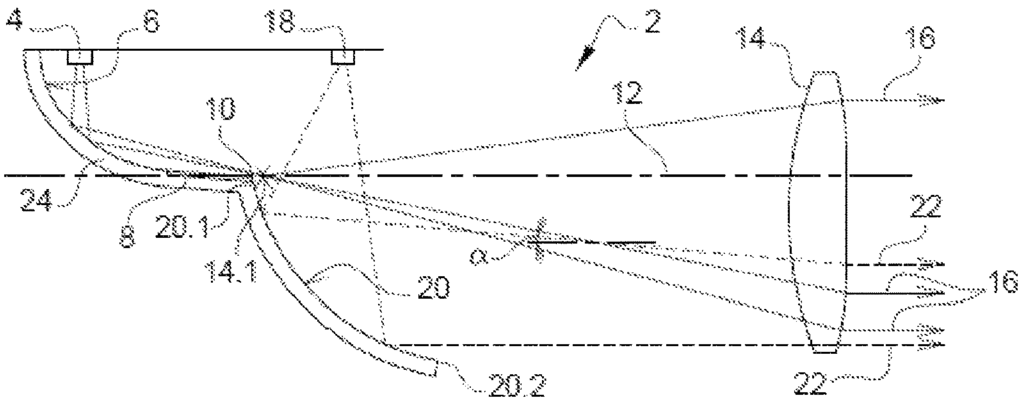
FIG. 1 is a diagrammatic longitudinal cross-sectional view of a luminous module according to a first embodiment of the invention.
Figure 2:
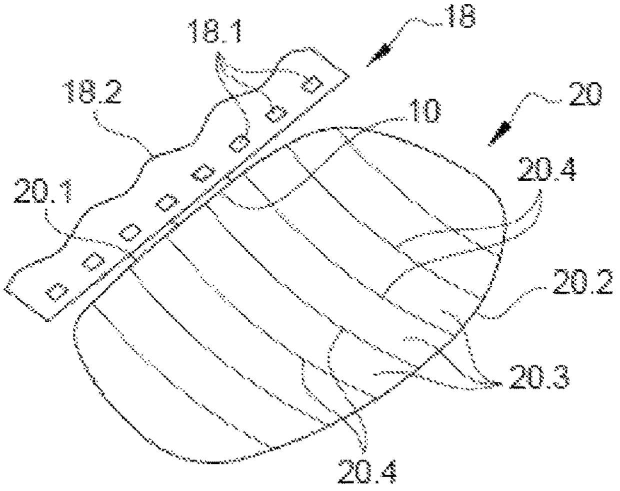
FIG. 2 is a perspective view of the second reflective surface and of the second light source of the luminous module of FIG. 1.
Figure 3:
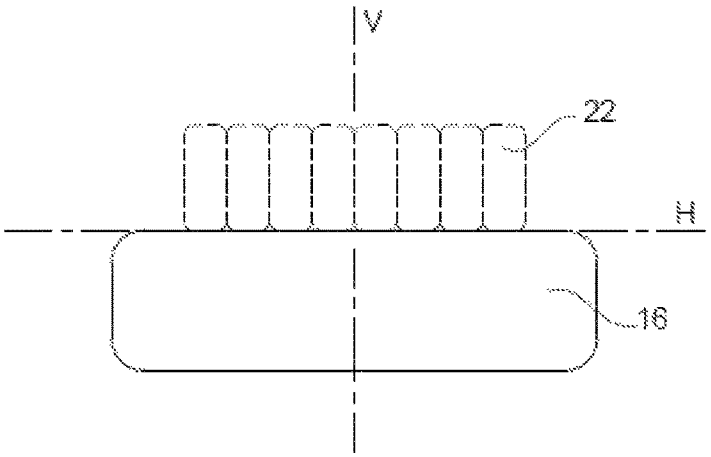
FIG. 3 is a graphic representation of the luminous image of the light beams produced by the luminous module of FIG. 1.

FIGS. 1 to 3 illustrate a luminous module according to a first embodiment of the invention.

FIG. 1 is a schematic longitudinal cross-sectional view of the luminous module. The luminous module 2 comprises a first light source 4 and a first reflective surface 6 configured to collect the light rays emitted by the first light source 4 and to reflect them to form a first light beam. The first reflective surface preferably has an elliptical profile and is advantageously a surface of revolution formed by rotating said profile so as to form a concave shape, in the present case skullcap or half-shell shape. It will however be understood that the first reflective surface is not necessarily a surface of revolution; it may deviate from such a configuration, in particular with a view to correcting certain aberrations and/or modifying the light beam somewhat. An auxiliary reflective surface 8, here called a deflector, is placed in front of the first reflective surface 6, with a front edge 10 located at a focal point of said surface and forming a cutoff-forming edge. The first light source 4 is located at another focal point of the first reflective surface 6. The light rays emitted by the first light source 4 are thus essentially collected and reflected toward the cutoff-forming edge. The light beams that encounter the deflector 8 behind the cutoff-forming edge 10 are reflected upward. The deflector 8 is advantageously planar and aligned with an optical axis 12 of the luminous module 2. A projecting lens 14, forming a projecting optical system, is placed at the front on the optical axis 12. It is configured to deviate the light rays emitted by the first light source 4 and reflected by the first reflective surface 6 and possibly by the deflector 8, so as to form a first light beam 16. The latter contains a horizontal cutoff defined by the cutoff-forming edge 10. The horizontal cutoff may contain a kink on the optical axis. In this case, the cutoff-forming edge 10 is not rectilinear but kinked. Such configurations are known per se to those skilled in the art and do not require further explanation.

The luminous module 2 comprises a second light source 18 and a second reflective surface 20 configured to collect the light rays emitted by the second light source 18 and to reflect them to form a second light beam. As may be seen in FIG. 1, the second light source 18 is offset axially with respect to the first light source 4. More specifically, the second light source 18 is located in front of the first light source 4. The two light sources 4 and 18 illuminate in the same direction, in the present case vertically downward considering the orientation of FIG. 1 in which the optical axis is horizontal. In the present case, the two light sources 4 and 18 are at the same distance from the optical axis 12 but this may not be the case.

The second reflective surface 20 advantageously has a profile of elliptical or parabolic type. It is advantageously a surface of revolution around an axis parallel to, or coinciding with, the optical axis. Alternatively, it may be a question of a free-form surface or a swept surface or an asymmetric surface. It may also include a plurality of sectors or segments.

The expression "parabolic type" generally applies to reflectors the surface of which has a single focal point, i.e. one region of convergence of the light rays, i.e. one region such that the light rays emitted by a light source placed in this region of convergence are projected to a great distance after reflection from the surface. Projected to a great distance means that these light rays do not converge toward a region located at at least 10 times the dimensions of the reflector. In other words, the reflected rays do not converge toward a region of convergence or, if do they converge, this region of convergence is located at a distance larger than or equal to 10 times the dimensions of the reflector. A parabolic surface may therefore feature or not feature parabolic segments. A reflector having such a surface is generally used alone to create a light beam. Alternatively, it may be used as projecting surface associated with an elliptical-type reflector. In this case, the light source of the parabolic-type reflector is the region of convergence of the rays reflected by the elliptical-type reflector.

The light source 18 is placed at a focal point of the second reflective surface 20 so that its rays are collected and reflected along the optical axis 12.

The projecting lens 14 has a focal point 14.1 that is advantageously located along the optical axis 12, plumb with the second light source 18 or, as in the present case, behind said source. In the present case, the focal point 14.1 is located on the second reflective surface 20 or in proximity thereto, and preferably less than 10 mm therefrom, and more preferably less than 5 mm therefrom. Furthermore, the projecting lens 14 has a depth of field sufficient to obtain stigmatism for at least some of the second reflective surface 20. Advantageously the depth of field of the projecting lens 14 is at least 30% and advantageously the entirety of the extent, along the optical axis, of the second reflective surface 20

The projecting lens 14 is advantageously a so-called thin lens, and for example smaller than 6 mm in thickness. This is possible when the rays to be deviated have a small inclination. To this end, at least some of these reflected rays may have angles of inclination $\alpha$ in a vertical plane with respect to said axis that are smaller than or equal to 25°, and preferably smaller than or equal to 10°, so that the so-called paraxial approximation applies. Advantageously, these rays are reflected by the rear portion of the second reflective surface 20.

By virtue of the arrangement such as described above, the projecting lens 14 thus images the second reflective surface 20 when the latter is illuminated, and more particularly images the segment of reflective surface closest the focal point 14.1. Advantageously, the latter is located on the rear edge 20.1 of the second reflective surface 20, so as to ensure the edge in question is imaged. This allows a vertically concentrated second light beam to be produced. In practice however, the focal point 14.1 is located at a distance from the rear edge 20.1, namely in front of said edge, in order to vertically widen the second light beam. Imaging with a certain precision the rear edge 20.1 of the second reflective surface 20 allows a lower horizontal cutoff to be formed in the second light beam 22. The second reflective surface 20 has a front edge 20.2 that will define the upper limit of the second light beam 22.

The second reflective surface 20, if it is of elliptical type, has a second focal point located in front of the projecting lens 14 and at distance from the optical axis 12. It will be noted that it is also possible for this focal point to be located behind the projecting lens and/or on the optical axis, provided that it is in proximity to the lens, so as to decrease the width of the beam at the entrance face of the projecting lens.

The first and second reflective surfaces 6 and 20 and the auxiliary reflective surface 8 (the deflector) may be formed on the same carrier forming a collector 24. The shell- or skullcap-shaped collector 24 is advantageously made of materials that resist heat well, and for example of glass or of synthetic polymers such as polycarbonate PC or polyetherimide PEI.

FIG. 2 illustrates in perspective the second light source 18 and the second reflective surface 20. As may be seen, the light source 18 comprises a plurality of light-emitting regions 18.1 on a carrier 18.2, said regions being individually activatable. It may be a question of a plurality of light-emitting diodes 18.1 placed on a printed circuit board 18.2. The second reflective surface 20 is segmented transversely to the optical axis so as to form mutually adjacent strips of reflective surface 20.3. Each of the strips of reflective surface 20.3 has a cross section forming a hollow profile. Thus, each of the strips of reflective surface 20.3 has two lateral edges 20.4 at the borders with the directly adjacent strips of reflective surface 20.3. Each strip of reflective surface 20.3 corresponds to one light-emitting region 18.1 and vice versa. When a specific light-emitting region 18.1 is activated and emits light rays, these predominantly illuminate the corresponding strip of reflective surface 20.3. These light rays may also illuminate the neighboring strips of reflective surface 20.3 but with angles that are not very favorable to a concentration of light along the optical axis or at least with limited angles of inclination with respect to said axis. These rays, once reflected, will partly disperse. This means that the lateral edges 20.4 form lateral cutoffs in the second beam.

FIG. 3 schematically illustrates the luminous images of the first and second light beams 16 and 22. It may be observed that the first beam 16 produced by the first light source 4, the first reflective surface 6, the auxiliary reflective surface and the projecting lens 14 is a beam containing a horizontal top cutoff, in the present case extending along the neutral horizontal axis H. It may thus be a question of a low beam or of one portion of such a beam. The second light beam 22 consists of an addition of sub-beams each corresponding to one of the light-emitting regions of the second light source and to the corresponding strip of reflective surface. These sub-beams are laterally adjacent. They have a common horizontal bottom cutoff, in the present case extending along the neutral horizontal axis H, which cutoff is formed by the rear edge 20.1 of the second reflective surface 20 (FIG. 1). They also have a common horizontal top cutoff formed by the front edge 20.2 of the second reflective surface 20 (FIG. 1). Said cutoff may however be less sharp than the horizontal bottom cutoff, essentially because of the larger distance between the focal point 14.1 of the projecting lens and the front edge 20.2 (FIG. 1). The second light beam 22 may form, in combination with the first beam 16, a segmented high beam, i.e. a high beam that may be modulated transversely by activating useful light-emitting regions of the second light source.

Figure 4:
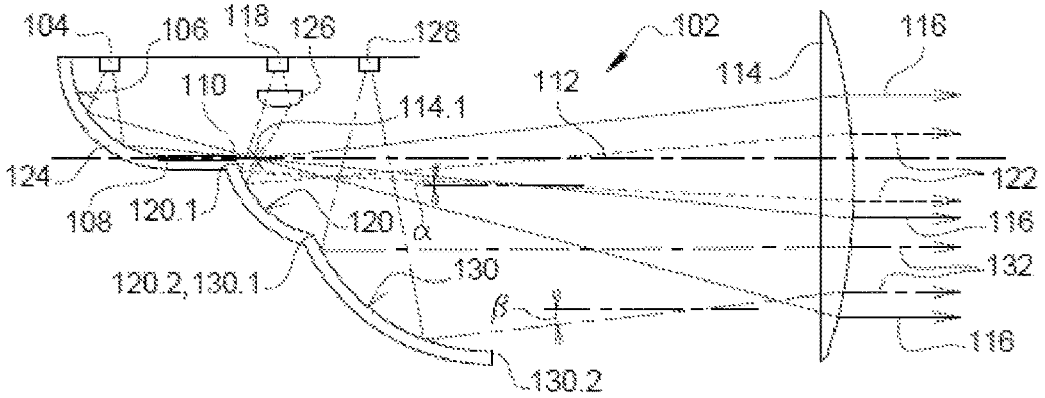
FIG. 4 is a diagrammatic longitudinal cross-sectional view of a luminous module according to a second embodiment of the invention.
Figure 5:
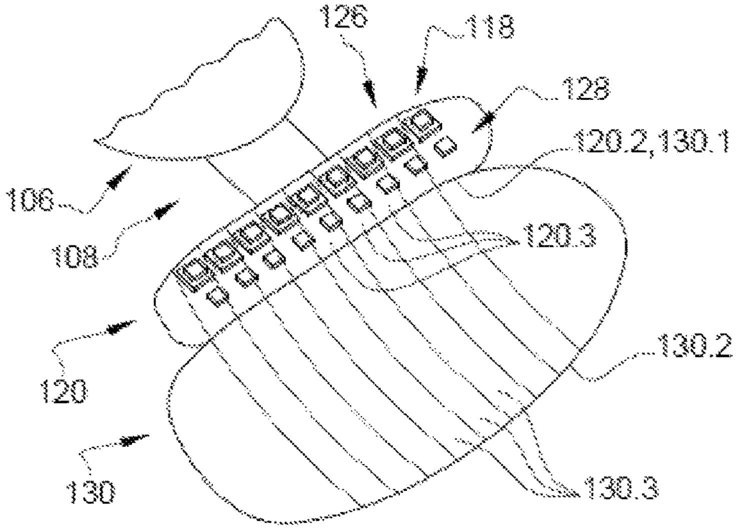
FIG. 5 is a perspective view of the reflective surfaces and of the second and third light sources of the luminous module of FIG. 4.
Figure 6:
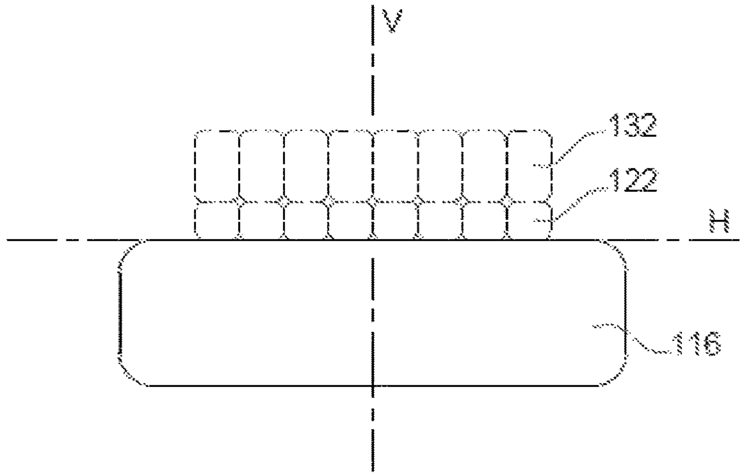
FIG. 6 is a graphic representation of the luminous image of the light beams produced by the luminous module of FIG. 4.

FIGS. 4 to 6 illustrate a second embodiment of the invention. The reference numbers of the first embodiment have been used to designate corresponding or identical elements, these numbers however being increased by 100. Reference is moreover made to the description of these elements that was given with regard to the first embodiment. Specific elements have been designated by specific numbers comprised between 100 and 200.

The second embodiment differs from the first embodiment essentially in the presence of a third light source and of a third reflective surface forming a third light beam.

FIG. 4 is a schematic longitudinal cross-sectional view of a luminous module according to the second embodiment. The luminous module 102 comprises, similarly to the first embodiment, a first light source 104, an associated first reflective surface 106 and an associated auxiliary reflective surface 108, called the deflector, with a cutoff-forming front edge 110, so as to form a first light beam 116 containing a horizontal top cutoff. Similarly to the first embodiment, the luminous module 102 also comprises a second light source 118 and an associated second reflective surface 120, so as to form a second light beam 122. However, with respect to the first embodiment, the length (along the optical axis) of the second reflective surface 120 is advantageously smaller, so as to form luminous images of smaller height, by way of complementary beam. This second light beam 122 has a horizontal bottom cutoff formed essentially by the rear edge 120.1 of the second reflective surface, which is imaged by the projecting lens 114. In the present case the latter is plan-convex, though it will be understood that other configurations are possible. A convergent optical system 126 is placed optically between the second light source 118 and the second reflective surface 120. It is configured to concentrate the light rays emitted by the second light source 118 toward the rear edge 120.1 of the second reflective surface 120. The convergent optical system 126 is in the present case a series of lenses placed facing each of the light-emitting regions of the second light source 118.

The luminous module 102 comprises a third light source 128 arranged in front of the second light source 118. It illuminates in the same direction as the first and second light sources, in the present case vertically downward considering the orientation of FIG. 4 in which the optical axis 112 is horizontal. A third reflective surface 130 is placed in front of the second reflective surface 120, and preferably adjacent to said second reflective surface 120. Similarly to the second reflective surface 120, the third reflective surface 130 advantageously has a profile of elliptical or parabolic type. It is advantageously a surface of revolution around an axis parallel to, or coinciding with, the optical axis. Alternatively, it may be a question of a free-form surface or a swept surface or an asymmetric surface. It may also include a plurality of sectors or segments.

The third light source 128 is placed at a focal point of the third reflective surface 130 so that its rays are collected and reflected along the optical axis 112. At least some of these reflected rays may have angles of inclination β in a vertical plane with respect to said axis that are smaller than or equal to 25°, and preferably smaller than or equal to 10°, so that the so-called paraxial approximation applies. Advantageously, these rays are reflected by the rear portion of the third reflective surface 130. The third light source 128, the third reflective surface 130 and the projecting lens 114 thus form a third light beam that also contains a horizontal bottom cutoff, located above the second light beam 122.

Similarly to the first embodiment, the sharpness of the horizontal cutoffs depends on the position of the focal point 114.1 of the projecting lens 114. If said focal point is located on the rear edge 120.1 of the second reflective surface 120, or at least in proximity thereto, the cutoff of the second beam 122 will be sharp. If said focal point is located further toward the front, at distance from said rear edge 120.1, the sharpness of the cutoff of the second beam 122 will decrease; in contrast, the sharpness of the cutoff of the third beam 132 will increase as the distance between the focal point and the rear edge 130.1 of the third reflective surface decreases. As already mentioned in relation to the first embodiment, the sharpness of the horizontal cutoffs will also depend on the depth of field of the projecting lens 114.

FIG. 5 is a perspective representation of the reflective surfaces 106, 120 and 130, and of the second and third light sources 118 and 128. It may be observed that each of the second and third light sources 118 and 128 comprises a series of light-emitting regions that are distributed transversely, individually activatable, and aligned with the transverse segmentation of the second and third reflective surfaces 120 and 130 into strips of reflective surface 120.3 and 130.3.

The convergent optical system 126 comprises a series of convergent lenses, each of which is placed optically between one of the light-emitting regions of the second light source 118 and the corresponding strip of reflective surface 120.3 of the second reflective surface 120.

FIG. 6 schematically illustrates the luminous images of the first, second and third light beams 116, 122 and 132. Similarly to the first embodiment, the first beam 116 is a beam containing a horizontal top cutoff, in the present case extending along the neutral horizontal axis H. It may thus be a question of a low beam or of one portion of such a beam. The second beam 122 consists of an addition of sub-beams each corresponding to one of the luminous regions of the second light source and to the corresponding strip of reflective surface. These sub-beams are laterally adjacent. They have a common horizontal bottom cutoff, in the present case extending parallel to the neutral horizontal axis H, on or below said horizontal axis H, which cutoff is formed by the rear edge 120.1 of the second reflective surface 120 (FIG. 4). They also have a common horizontal top cutoff formed by the front edge 120.2 of the second reflective surface 120 (FIG. 4). Said cutoff may however be less sharp than the horizontal bottom cutoff, essentially because of the larger distance between the focal point 114.1 of the projecting lens and the front edge 120.2 (FIG. 4). The second beam 122 allows the first beam 116 to be complemented in order to form a low lighting beam. Selective activation of the sub-beams allows an overall beam containing a kinked cutoff to be formed. In addition, selective activation of the sub-beams allows the position of the kink to be moved depending on the bend being taken by the vehicle, and thus a DBL function to be achieved (DBL standing for Dynamic Bending Light). The third light beam 132 is similar to the second light beam 122, except that it is located above the latter and has a larger height. The sub-beams of the second and third beams are in the present case aligned but may be offset transversely. The second and third light beams 122 and 132 may form, in combination with the first beam 116, a segmented high beam, i.e. a high beam that may be modulated transversely by activating useful light-emitting regions of the second and third light sources.

Figure 7:
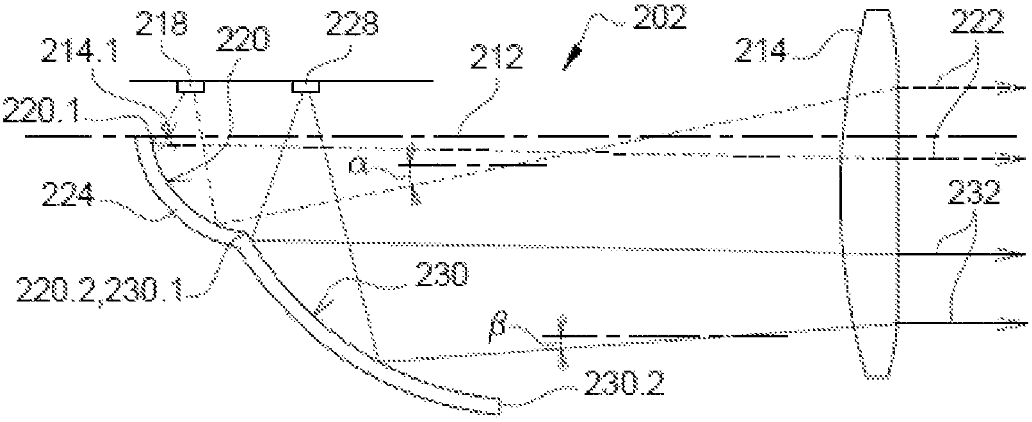
FIG. 7 is a diagrammatic longitudinal cross-sectional view of a luminous module according to a third embodiment of the invention.
Figure 8:
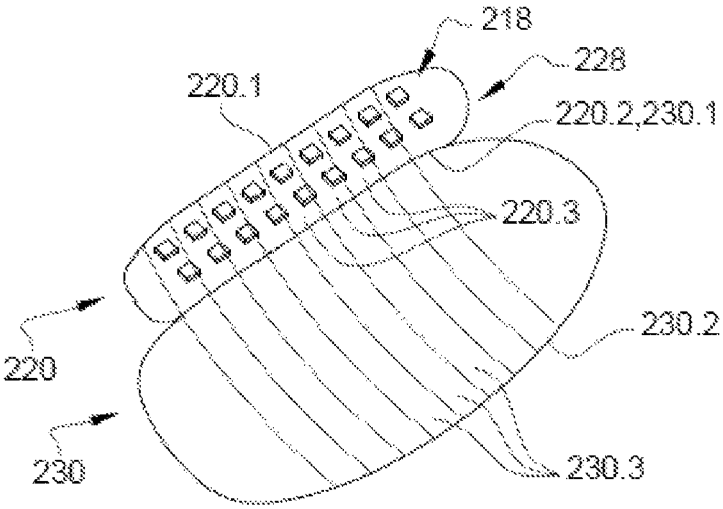
FIG. 8 is a perspective view of the reflective surfaces and of the light sources of the luminous module of FIG. 7.
Figure 9:
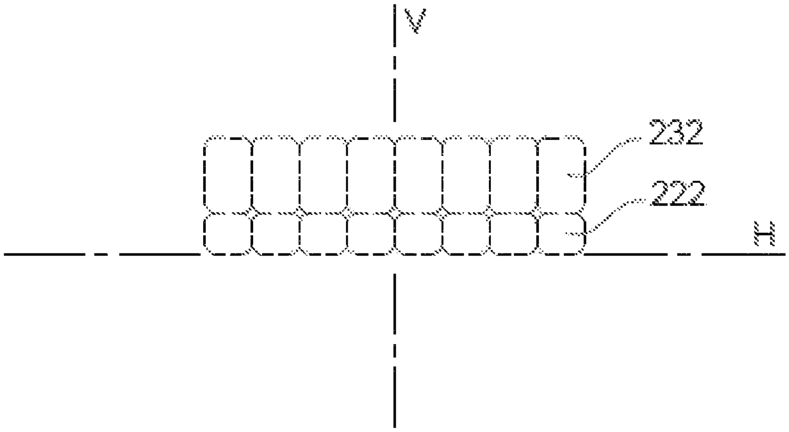
FIG. 9 is a graphic representation of the luminous image of the light beams produced by the luminous module of FIG. 7.

FIGS. 7 to 9 illustrate a third embodiment of the invention. The reference numbers of the second embodiment have been used to designate corresponding or identical elements, these numbers however being increased by 100. Reference is moreover made to the description of these elements that was given with regard to the second embodiment.

The third embodiment is similar to the second embodiment and differs therefrom essentially in the absence of the horizontal-top-cutoff-containing first light beam and of the components that produce it. The second and third light beams of the second embodiment then become the first and second light beams of the third embodiment.

FIG. 7 is a schematic longitudinal cross-sectional view of a luminous module according to the third embodiment of the invention. The luminous module 202 comprises a first light source 218 and an associated first reflective surface 220 that is configured to collect and reflect light rays along the optical axis 212 and hence at least some of these reflected rays have angles of inclination α in a vertical plane with respect to said axis that are smaller than or equal to 25°, and preferably smaller than or equal to 10°, so that the so-called paraxial approximation applies, allowing stigmatism, i.e. a sharp projected image, to be obtained. The first light source 218 and the first reflective surface 220 then produce, with the projecting lens 214, a first light beam 222 with a horizontal bottom cutoff. The luminous module 202 further comprises a second light source 228 and an associated second reflective surface 230 that is configured to collect and reflect light rays along the optical axis 212 and hence at least some of these reflected rays have angles of inclination β in a vertical plane with respect to said axis that are smaller than or equal to 25°, and preferably smaller than or equal to 10°, so that the so-called paraxial approximation also applies. The second light source 228 and the second reflective surface 220 then produce, with the projecting lens 214, a second light beam 232 with a horizontal bottom cutoff, located above the first light beam 222.

Similarly to the first and second embodiments, the sharpness of the horizontal cutoffs depends on the position of the focal point 214.1 of the projecting lens 214. If said focal point is located on the rear edge 220.1 of the first reflective surface 220, or at least in proximity thereto, the cutoff of the first beam 222 will be sharp. If said focal point is located further toward the front, at distance from said rear edge 220.1, the sharpness of the cutoff of the first beam 222 will decrease; in contrast, the sharpness of the cutoff of the second beam 132 will increase as the distance between the focal point and the rear edge 130.1 of the second reflective surface decreases.

FIG. 8 is a perspective representation of the reflective surfaces 220 and 230, and of the second and third light sources 118 and 128. It may be observed that each of the second and third light sources 118 and 128 comprises a series of light-emitting regions that are distributed transversely, individually activatable, and aligned with the transverse segmentation of the second and third reflective surfaces 220 and 230 into strips of reflective surface 220.3 and 230.3.

FIG. 9 schematically illustrates the luminous images of the first and second light beams 222 and 232. The first beam 122 consists of an addition of sub-beams each corresponding to one of the luminous regions of the first light source and to the corresponding strip of reflective surface. These sub-beams are laterally adjacent. They have a common horizontal bottom cutoff, in the present case extending parallel to the neutral horizontal axis H, on or below said axis, which cutoff is formed by the rear edge 220.1 of the first reflective surface 220 (FIG. 7). They also have a common horizontal top cutoff formed by the front edge 220.2 of the first reflective surface 220 (FIG. 7). Said cutoff may however be less sharp than the horizontal bottom cutoff, essentially because of the larger distance between the focal point 214.1 of the projecting lens and the front edge 220.2 (FIG. 7). The second light beam 232 is similar to the first light beam 222, except that it is located above the latter and has a larger height. The sub-beams of the first and second beams are in the present case aligned but may be offset transversely. The first beam 222 may, in combination with a beam containing a horizontal top cutoff, produce a low lighting beam. Selective activation of the sub-beams allows an overall beam containing a kinked cutoff to be formed. Selective activation of the sub-beams allows the position of the kink to be moved depending on the bend being taken by the vehicle, and thus a DBL function to be achieved. The first and second light beams 222 and 232 may produce, in combination with a horizontal-top-cutoff-containing beam produced by another module, a high lighting beam of matrix type, i.e. a high beam that may be modulated transversely by activating useful light-emitting regions of the second and third light sources.

What is claimed is:

1. A luminous module, comprising:

a collector having a first reflective surface, a second reflective surface, and a planar auxiliary reflective surface;

a first light source able to emit light rays, and the first reflective surface configured to collect and reflect the light rays directly emitted by the first light source into a first light beam along an optical axis of the module;

a second light source and the second reflective surface configured to collect and reflect the light rays directly emitted by the second light source into a second light beam along the optical axis; s the planar auxiliary reflective surface between the first reflective surface and the second reflective surface and between the first light source and the second light source;

an optical system configured to project the first and second light beams;

wherein the first and second light sources emit the light rays in the same direction, the first and second reflective surfaces are offset along the optical axis, and the optical system is configured to form an image of the second reflective surface.

2. The luminous module as claimed in claim 1, further comprising a third light source able to emit light rays, and a third reflective surface of the collector adjacent to, and in front of, the second reflective surface, the third reflective surface being configured to collect and reflect the light rays emitted by the third light source into a third light beam along the optical axis.

3. The luminous module as claimed in claim 2, wherein the third reflective surface includes a rear edge forming a horizontal cutoff in the third beam.

4. The luminous module as claimed in claim 2, wherein the third reflective surface is segmented transversely to the optical axis so as to form adjacent strips of reflective surface, the third light source includes a plurality of individually activatable light-emitting regions that extend transversely and that are associated with the adjacent strips of reflective surface.

5. The luminous module as claimed in claim 1, wherein the first reflective surface has an elliptical profile with a first focal point corresponding to the first light source and a second focal point, and the planar auxiliary reflective surface with a front edge located at the second focal point, the front edge forming an edge forming a horizontal cutoff with or without a kink in the first beam.

6. The luminous module as claimed in, claim 5, wherein the rear edge of the second reflective surface is adjacent to, or coincides with, the edge forming a horizontal cutoff with or without a kink in the first beam.

7. The luminous module as claimed in claim 1, wherein the first and second reflective surfaces are formed on the same collector.

8. The luminous module as claimed in claim 1, wherein the second reflective surface is segmented transversely to the optical axis so as to form adjacent strips of reflective surface, the second light source including a plurality of individually activatable light-emitting regions that extend transversely and that are associated with the adjacent strips of reflective surface.

9. The luminous module as claimed in claim 1, wherein the second reflective surface includes a rear edge forming a horizontal cutoff in the second light beam.

10. The luminous module as claimed in claim 1, wherein the optical system has a focal point located on the second reflective surface or at a distance from the second reflective surface smaller than 10 mm.

11. The luminous module as claimed in claim 10, wherein the focal point of the optical system is located on the rear edge from the second reflective surface or at a distance from the rear edge smaller than 10 mm.

12. The luminous module as claimed in claim 1, wherein each of the first and second reflective surfaces has an elliptical or parabolic profile.

13. The luminous module as claimed in claim 1, wherein the first reflective surface is adjacent to, and behind, the second reflective surface, and the optical system is configured to also form an image of the first reflective surface.

14. The luminous module as claimed in claim 1, wherein the first reflective surface is segmented transversely to the optical axis so as to form adjacent strips of reflective surface, the first light source including a plurality of individually activatable light-emitting regions that extend transversely and that are associated with the adjacent strips of reflective surface.

15. The luminous module as claimed in claim 1, wherein the planar auxiliary reflective surface is parallel to the optical axis.

16. A luminous module, comprising:

a collector having a first reflective surface, a second reflective surface, and a third reflective surface;

a first light source able to emit light rays, and the first reflective surface configured to collect and reflect the light rays emitted by the first light source into a first light beam along an optical axis of the module;

a second light source and the second reflective surface configured to collect and reflect the light rays emitted by the second light source into a second light beam along the optical axis;

a third light source able to emit light rays, and the third reflective surface adjacent to, and in front of, the second reflective surface, the third surface being configured to collect and reflect the light rays emitted by the third light source into a third light beam along the optical axis, with the first reflective surface, the second reflective surface, and the third reflective surface being parts of a continuous surface;

an optical system configured to project the first and second light beams;

wherein the first and second light sources emit the light rays in the same direction, the first and second reflective surfaces are offset along the optical axis, and the optical system is configured to form an image of the second reflective surface.

17. The luminous module as claimed in claim 16, wherein the luminous module further comprises an optical concentrating device placed optically between the second light source and the second reflective surface, and configured to concentrate the light rays emitted by the second light source toward a rear edge of the second reflective surface.

* * * * *